United States Patent
Glueck et al.

(10) Patent No.: US 11,213,879 B2
(45) Date of Patent: Jan. 4, 2022

(54) DEVICE AND METHOD FOR PRODUCING A COMPONENT

(71) Applicant: Bayerische Motoren Werke Aktiengesellschaft, Munich (DE)

(72) Inventors: Bernhard Glueck, Fuerstenfeldbruck (DE); Robert Kirschner, Olching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 375 days.

(21) Appl. No.: 16/381,679

(22) Filed: Apr. 11, 2019

(65) Prior Publication Data

US 2019/0232361 A1 Aug. 1, 2019

Related U.S. Application Data

(63) Continuation of application No. PCT/EP2018/050512, filed on Jan. 10, 2018.

(30) Foreign Application Priority Data

Jan. 16, 2017 (DE) ..................... 10 2017 200 575.0

(51) Int. Cl.
*B21J 15/32* (2006.01)
*B21K 25/00* (2006.01)
(Continued)

(52) U.S. Cl.
CPC ............... *B21J 15/32* (2013.01); *B21J 15/00* (2013.01); *B21K 25/00* (2013.01); *B23P 19/001* (2013.01);
(Continued)

(58) Field of Classification Search
CPC ..... B21J 15/32; B21J 15/00; B21J 5/00; B21J 15/02; B21K 25/00; B21D 43/02;
(Continued)

(56) References Cited

U.S. PATENT DOCUMENTS 3,001,279 A * 9/1961 Sherrill ................. B21D 22/04
72/41
3,634,928 A * 1/1972 Falcioni ................. F16B 19/06
29/509
(Continued)

FOREIGN PATENT DOCUMENTS

CN 202684505 U 1/2013
CN 105127352 A 12/2015
(Continued)

OTHER PUBLICATIONS

International Search Report (PCT/ISA/210) issued in PCT Application No. PCT/EP2018/050512 dated Jun. 6, 2018 with English translation (eight pages).

(Continued)

*Primary Examiner* — Sarang Afzali
*Assistant Examiner* — Darrell C Ford
(74) *Attorney, Agent, or Firm* — Crowell & Moring LLP

(57) ABSTRACT

A device and method for producing a component are provided. The device or method includes steps or units for providing a first component element having a recess in or on a first surface of the first component element, and for positioning a second component element in the region of the recess. The device or method also includes a step or unit for pressing the first component element and the second component element together, and as a result forming a material fit, positive fit and/or non-positive fit between the first and the second component elements at least in the region of the recess. The positioning and the pressing can be carried out or are carried out functionally, in particular, spatially and/or temporally, in terms of equipment, separately from each other.

17 Claims, 18 Drawing Sheets

US 11,213,879 B2

Page 2

(51) Int. Cl.
*B23P 19/00* (2006.01)
*F16B 17/00* (2006.01)
*B21J 15/00* (2006.01)
*B21J 15/02* (2006.01)
*B21D 43/02* (2006.01)
*B21J 5/00* (2006.01)
*B23P 17/00* (2006.01)
*B23P 11/00* (2006.01)
*F16B 5/08* (2006.01)

(52) U.S. Cl.
CPC .............. *F16B 5/08* (2013.01); *F16B 17/008* (2013.01); *B21D 43/02* (2013.01); *B21J 5/00* (2013.01); *B21J 15/02* (2013.01); *B23P 11/00* (2013.01); *B23P 17/00* (2013.01); *Y10T 29/49826* (2015.01); *Y10T 29/49906* (2015.01); *Y10T 29/49908* (2015.01); *Y10T 29/49936* (2015.01); *Y10T 29/49945* (2015.01); *Y10T 29/53709* (2015.01)

(58) Field of Classification Search
CPC ......... B23P 17/00; B23P 11/00; B23P 19/001; Y10T 29/49908; Y10T 29/53709; Y10T 29/49945; Y10T 29/49826; Y10T 29/49936; Y10T 29/49906; F16B 5/08; F16B 17/008
USPC ............ 29/428, 469.5, 505, 521, 525, 243.5
See application file for complete search history.

(56) References Cited

U.S. PATENT DOCUMENTS

| 4,051,592 | A | * | 10/1977 | Briles | B21J 15/02 |
| | | | | | 29/509 |
| 5,036,576 | A | * | 8/1991 | Gast | B21J 15/32 |
| | | | | | 29/407.01 |
| 5,146,062 | A | | 9/1992 | Koda et al. | |
| 5,305,517 | A | * | 4/1994 | Schleicher | B21D 39/031 |
| | | | | | 29/243.53 |
| RE35,619 | E | * | 10/1997 | Muller | B23P 19/062 |
| | | | | | 227/119 |
| 7,401,394 | B1 | * | 7/2008 | Muller | B23P 19/062 |
| | | | | | 29/432.1 |
| 11,028,865 | B2 | * | 6/2021 | Potocki | B21J 15/147 |
| 2003/0170073 | A1 | * | 9/2003 | Luthi | F16B 17/008 |
| | | | | | 403/278 |
| 2007/0289354 | A1 | * | 12/2007 | Reiter | B23P 19/005 |
| | | | | | 72/424 |
| 2009/0266866 | A1 | * | 10/2009 | Davies | B21J 15/32 |
| | | | | | 227/139 |
| 2011/0252626 | A1 | * | 10/2011 | Williams | B21J 15/32 |
| | | | | | 29/525.01 |
| 2012/0291262 | A1 | * | 11/2012 | Clinch | B29C 66/30326 |
| | | | | | 29/525.05 |
| 2013/0104393 | A1 | * | 5/2013 | Chang | B21J 15/32 |
| | | | | | 29/818 |
| 2013/0270229 | A1 | * | 10/2013 | Pedersen | F16B 5/04 |
| | | | | | 219/106 |
| 2014/0304972 | A1 | * | 10/2014 | Goehlich | B21J 15/32 |
| | | | | | 29/525.06 |
| 2015/0143685 | A1 | * | 5/2015 | Freis | B21D 39/031 |
| | | | | | 29/509 |

FOREIGN PATENT DOCUMENTS

| CN | 105408048 A | 3/2016 |
| CN | 205519468 U | 8/2016 |
| DE | 1 577 090 A1 | 4/1970 |
| DE | 690 06 088 T2 | 6/1994 |
| DE | 199 41 938 A1 | 4/2001 |
| DE | 199 41 938 B4 | 6/2005 |
| DE | 20 2008 014 886 U1 | 5/2010 |
| DE | 10 2010 044 886 A1 | 5/2011 |
| DE | 10 2010 020 569 A1 | 11/2011 |
| JP | 59-127975 A | 7/1984 |
| JP | 2015-44228 A | 3/2015 |

OTHER PUBLICATIONS

German-language Written Opinion (PCT/ISA/237) issued in PCT Application No. PCT/EP2018/050512 dated Jun. 6, 2018 (12 pages).
German-language Search Report issued in counterpart German Application No. 10 2017 200 575.0 dated Aug. 17, 2017 with partial English translation (12 pages).
English translation of Chinese Office Action issued in Chinese Application No. 201880004108.4 dated Jul. 15, 2020 (12 pages).
English translation of Chinese-language Office Action issued in counterpart Chinese Application No. 201880004108.4 dated Dec. 11, 2019 (10 pages).

* cited by examiner

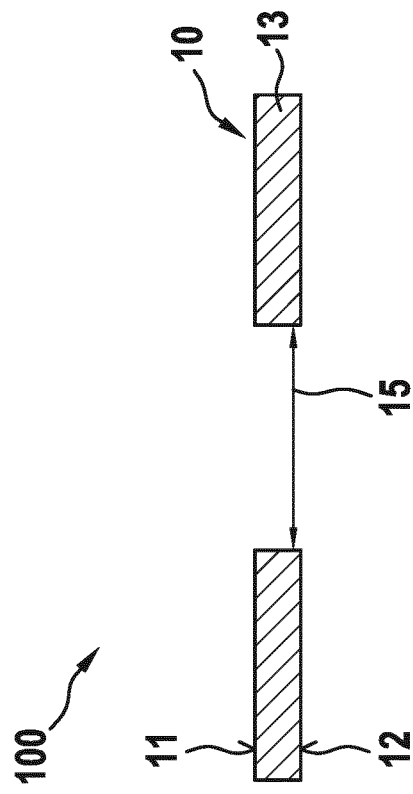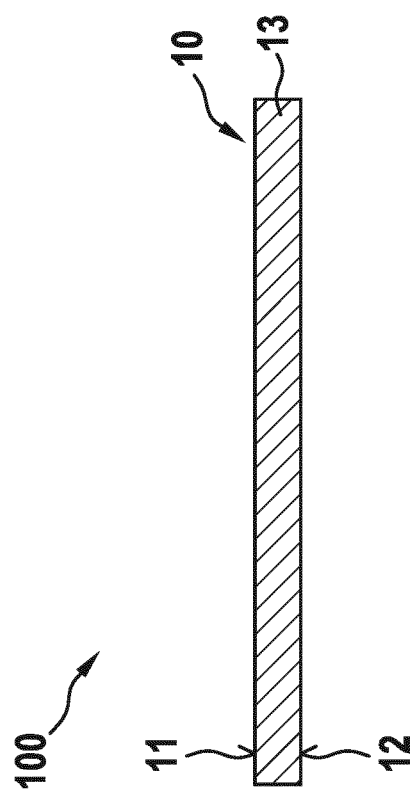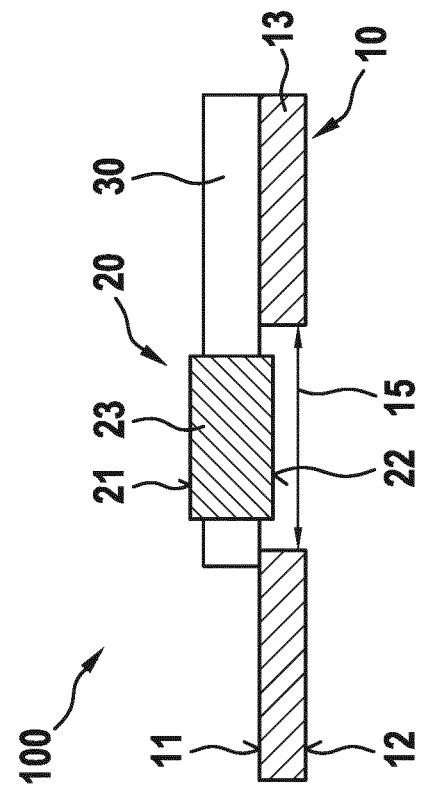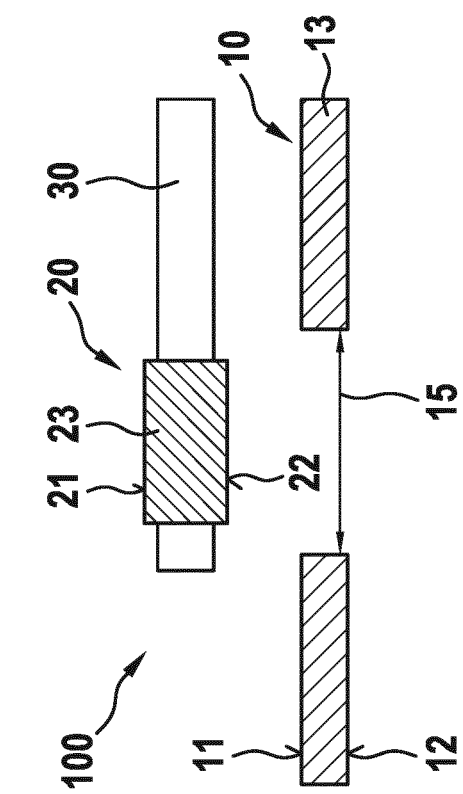

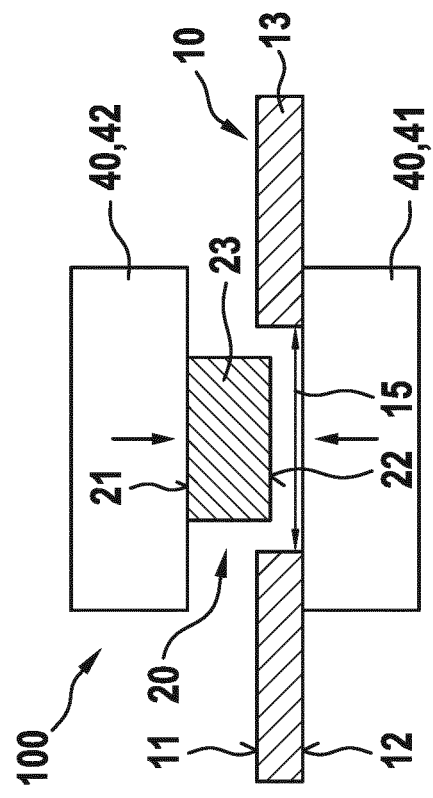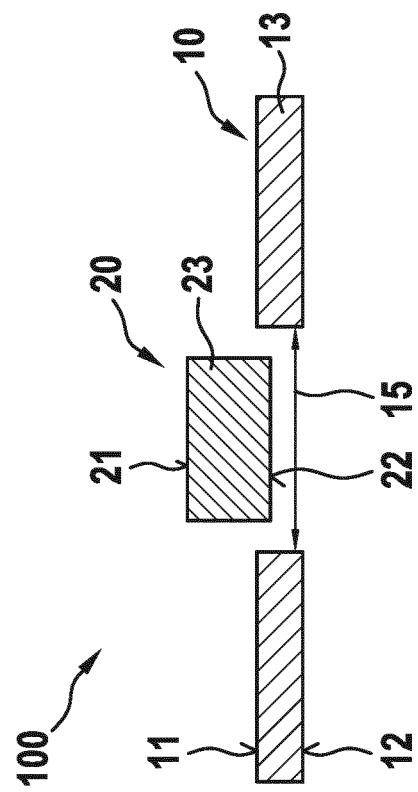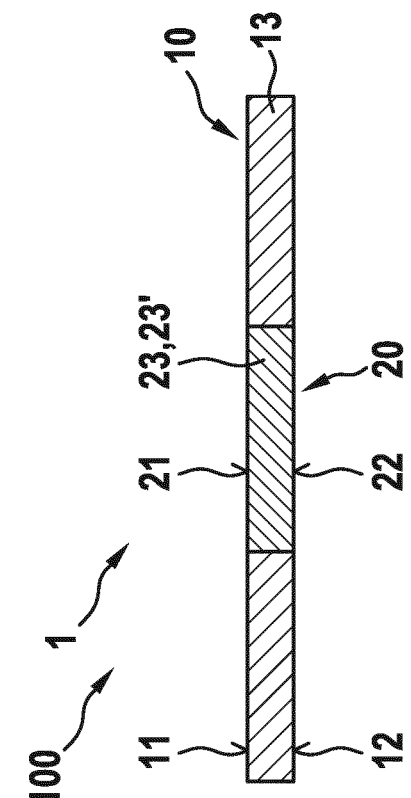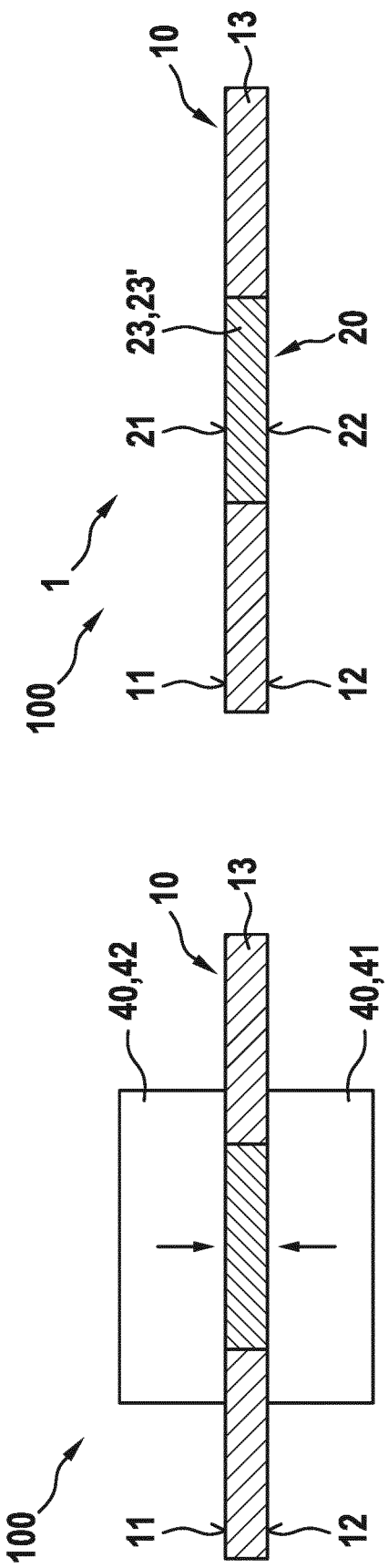

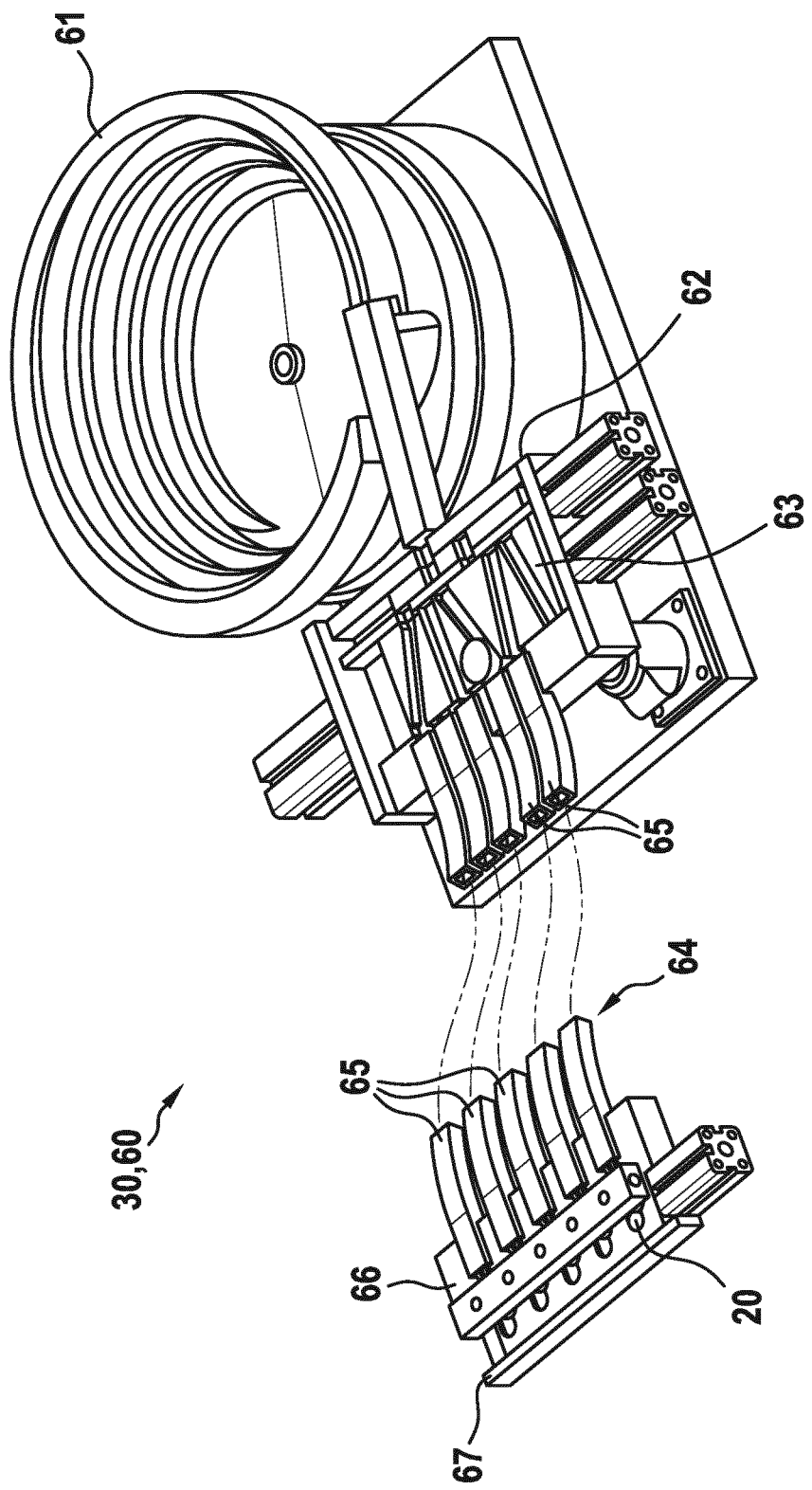

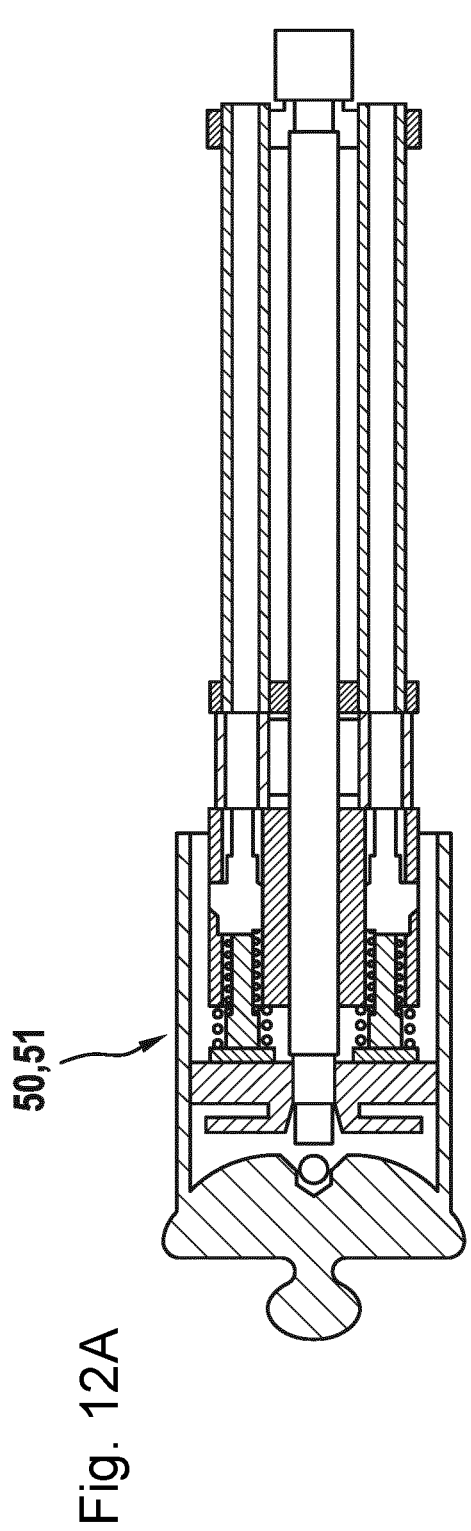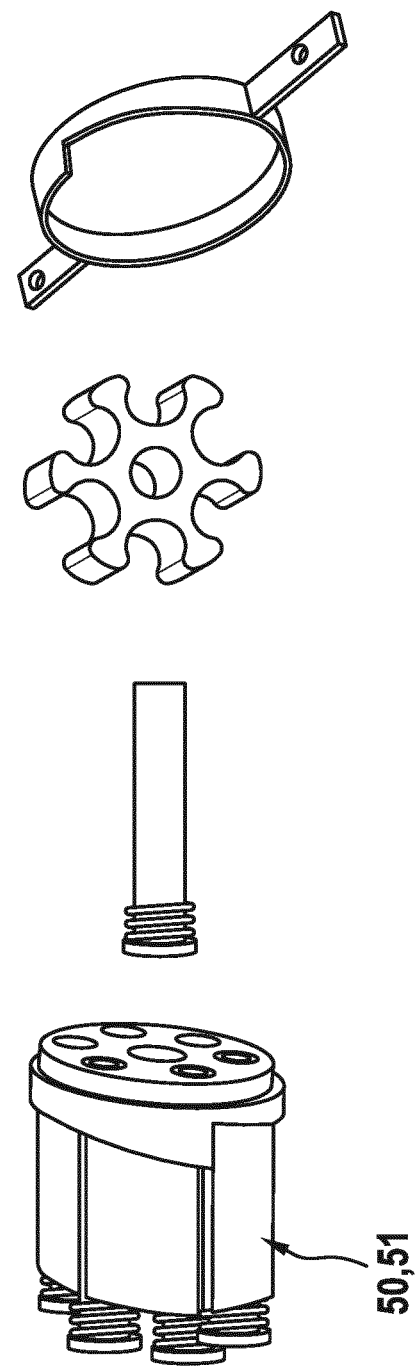
Fig. 12A
Fig. 12B

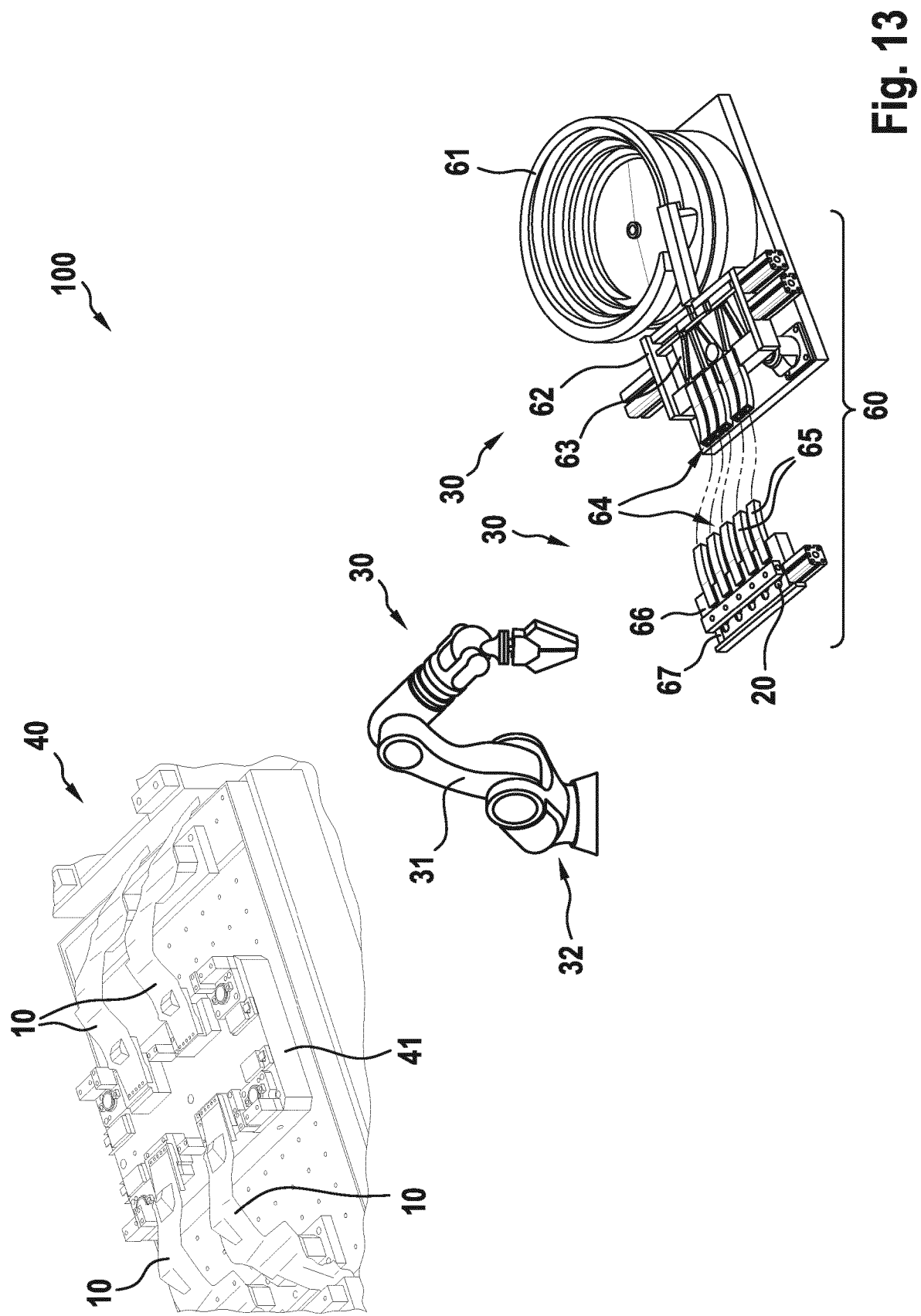

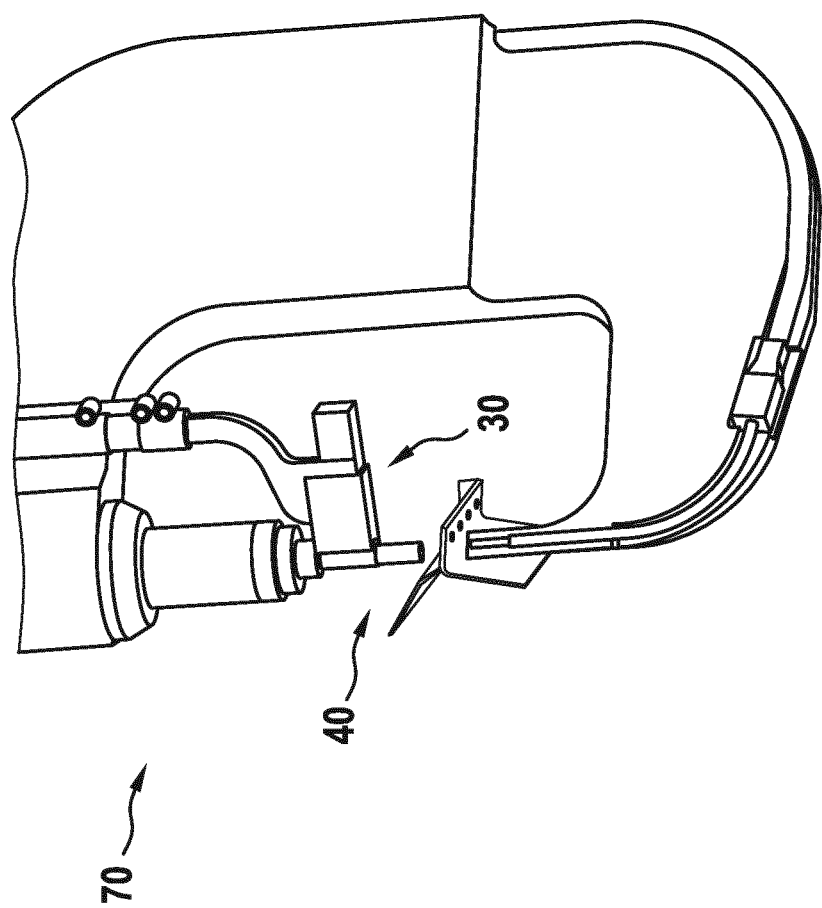

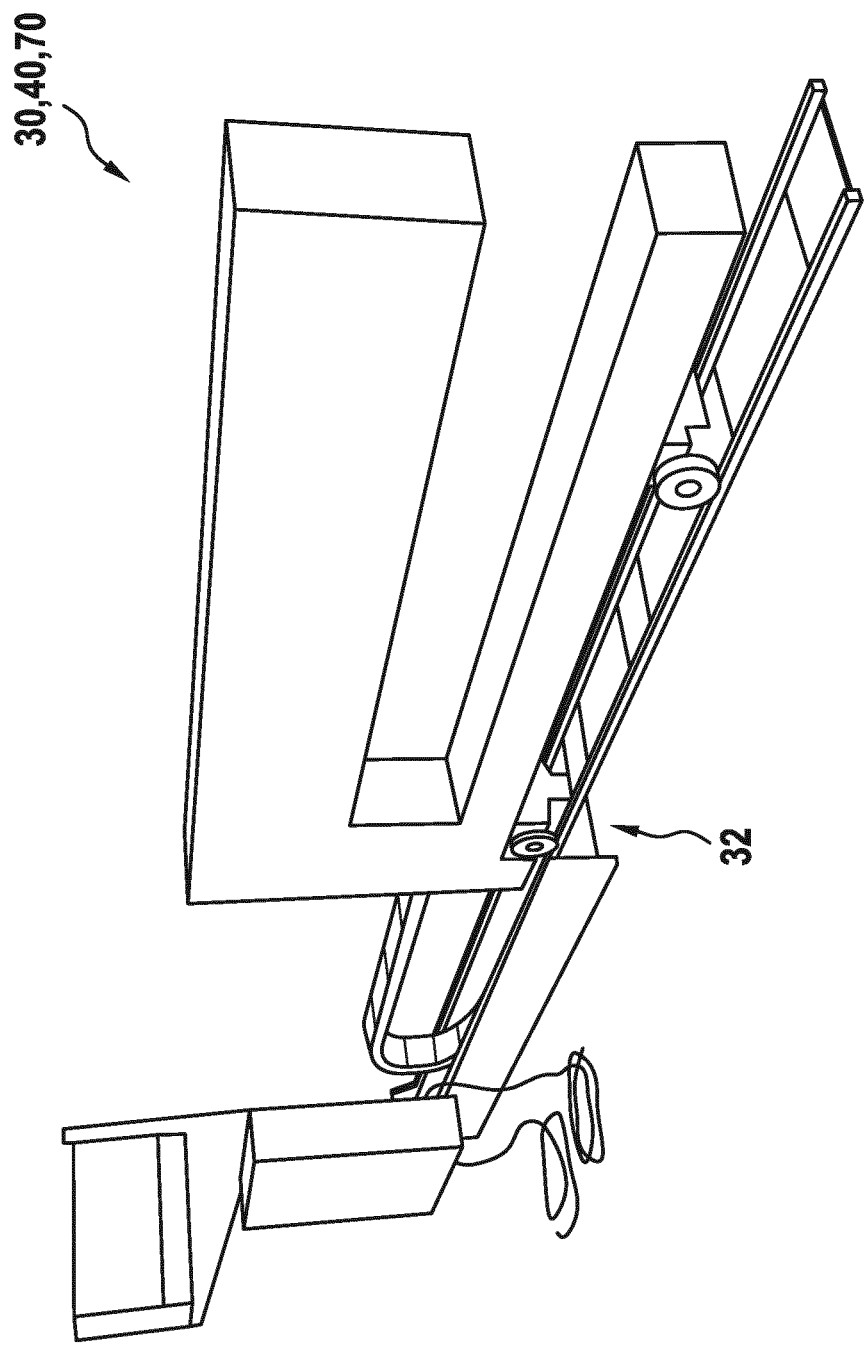

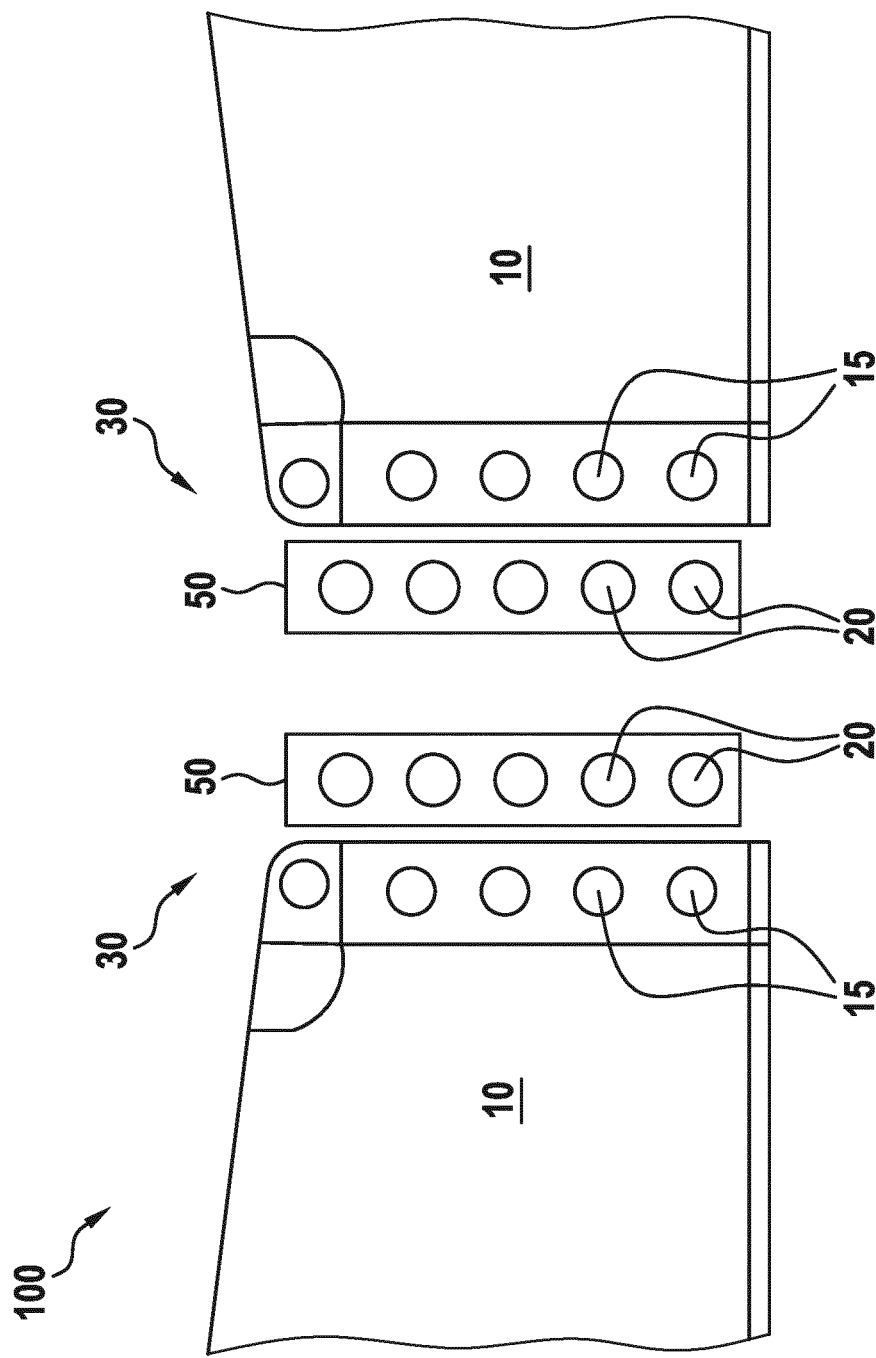

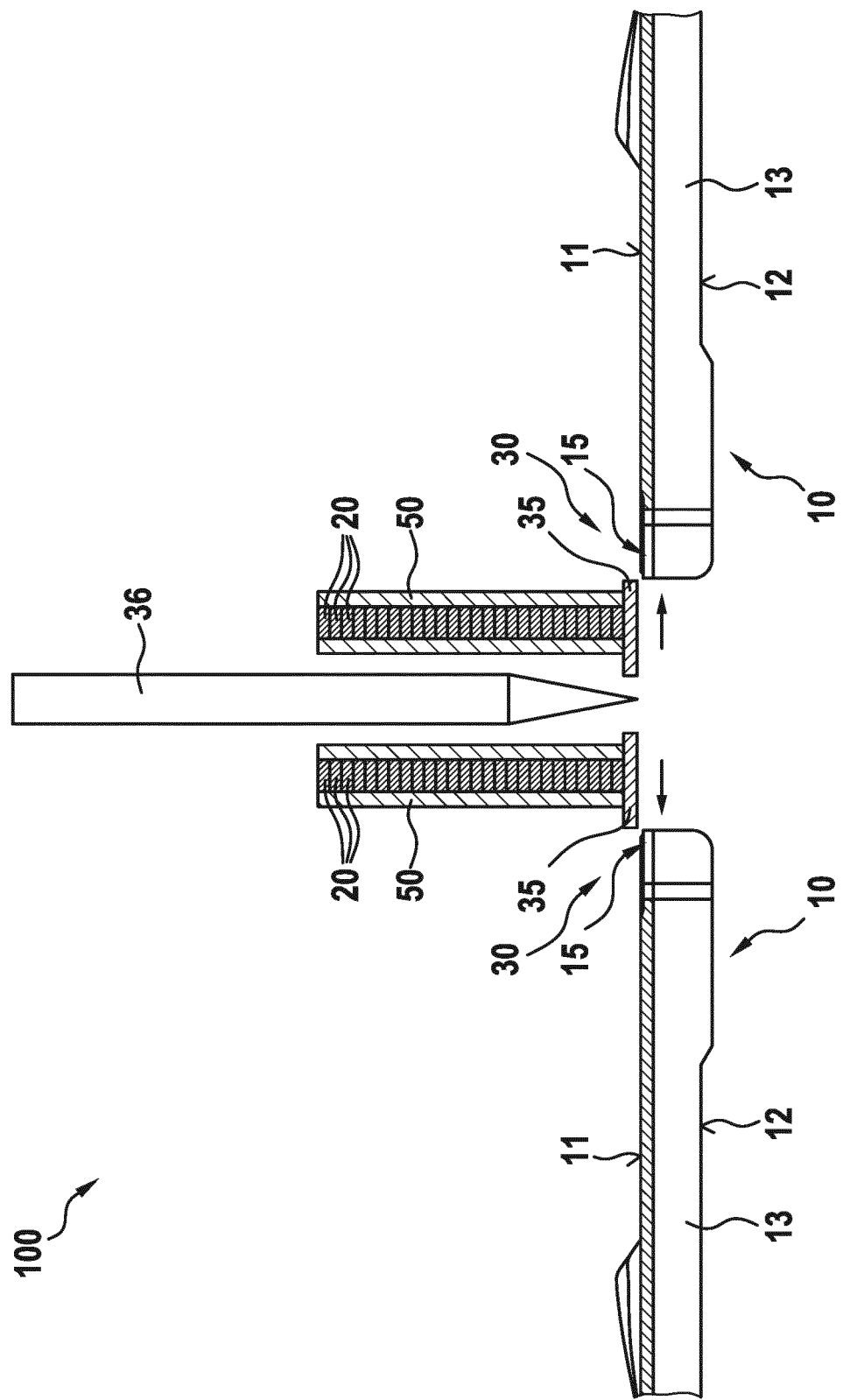

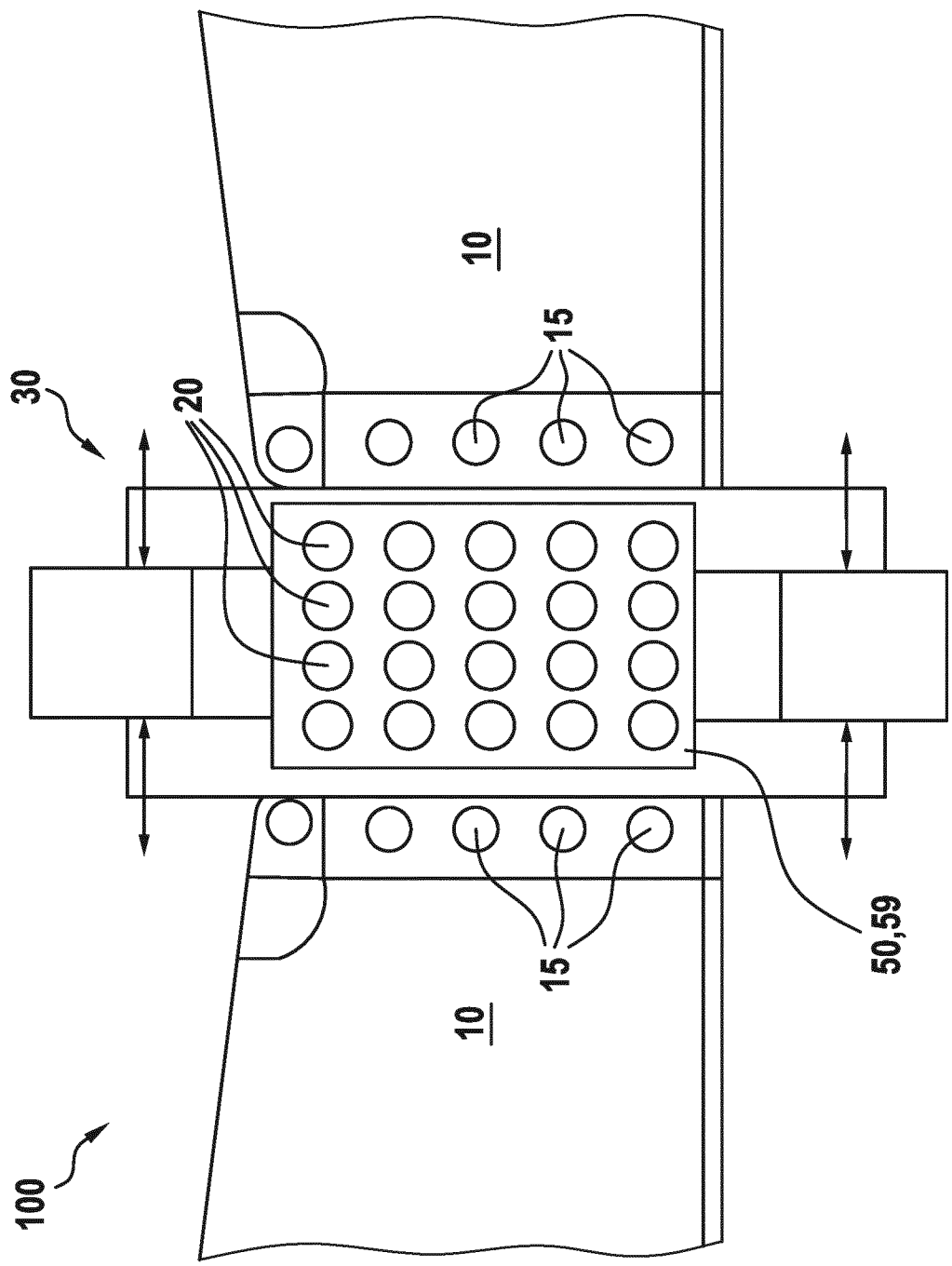

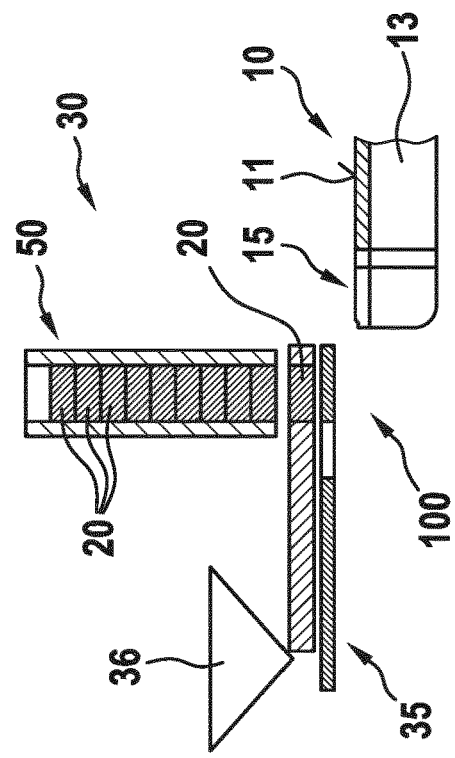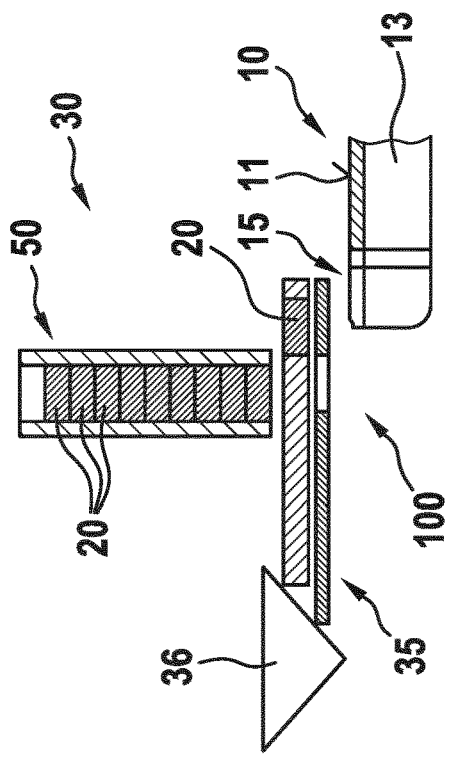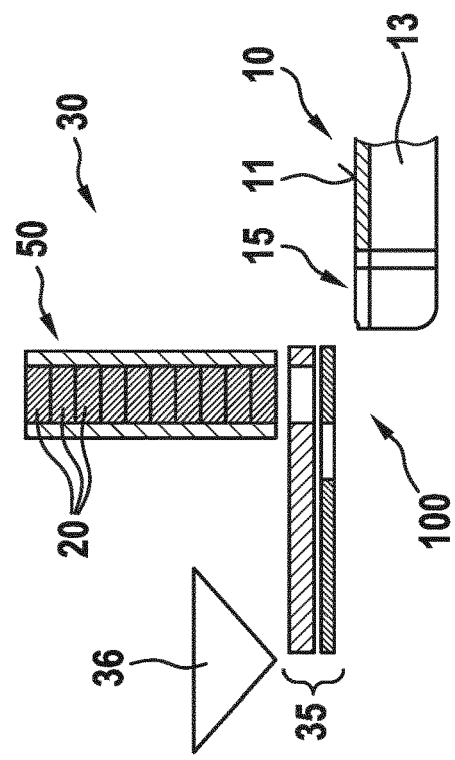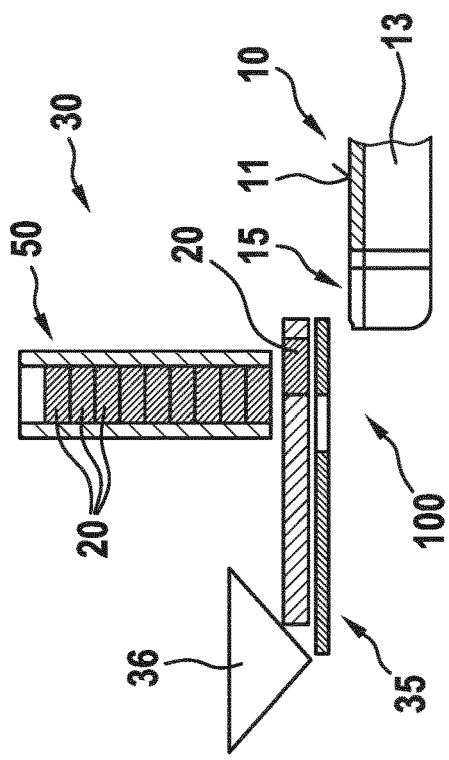

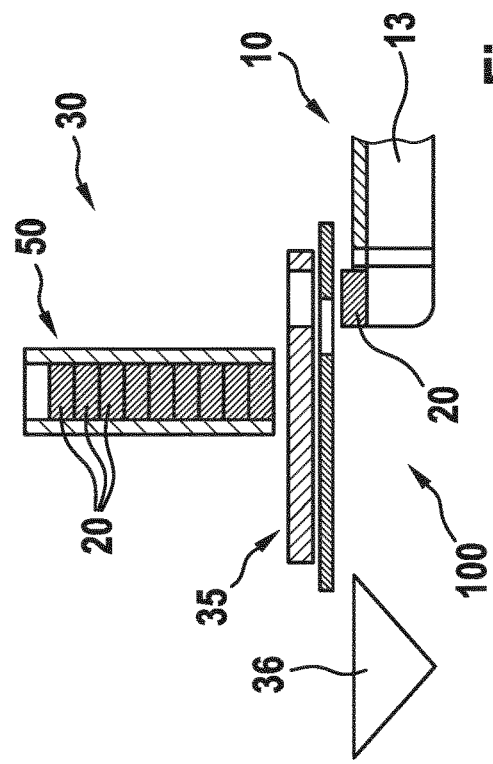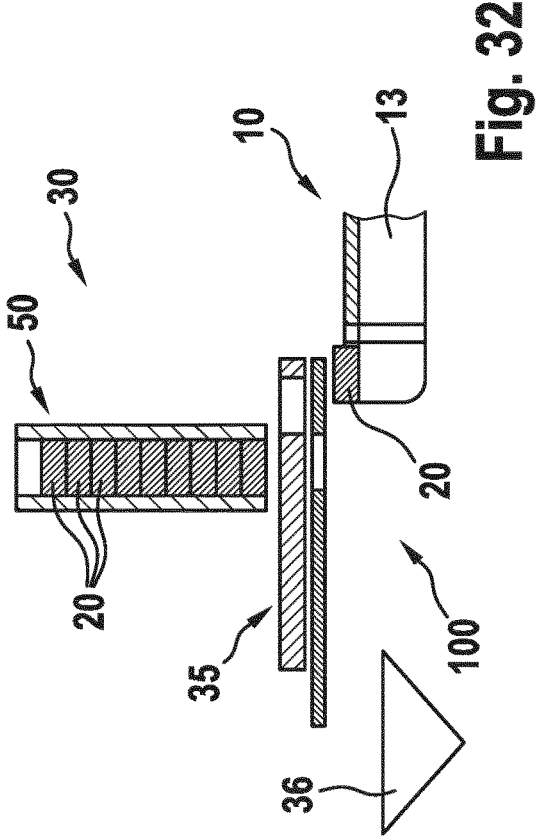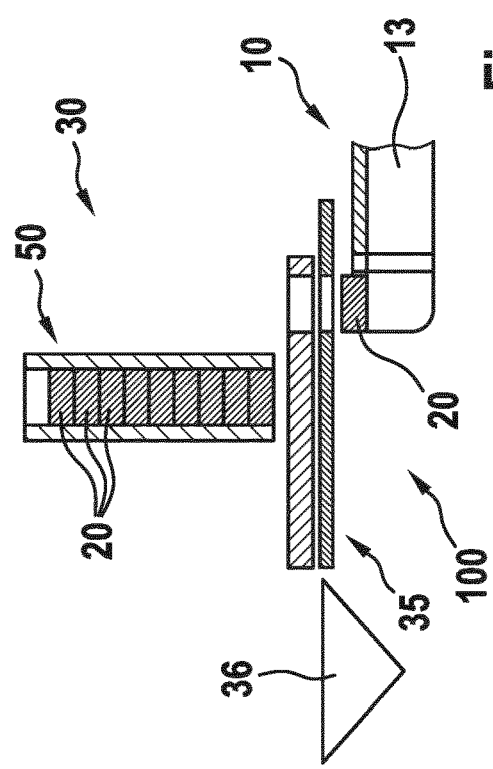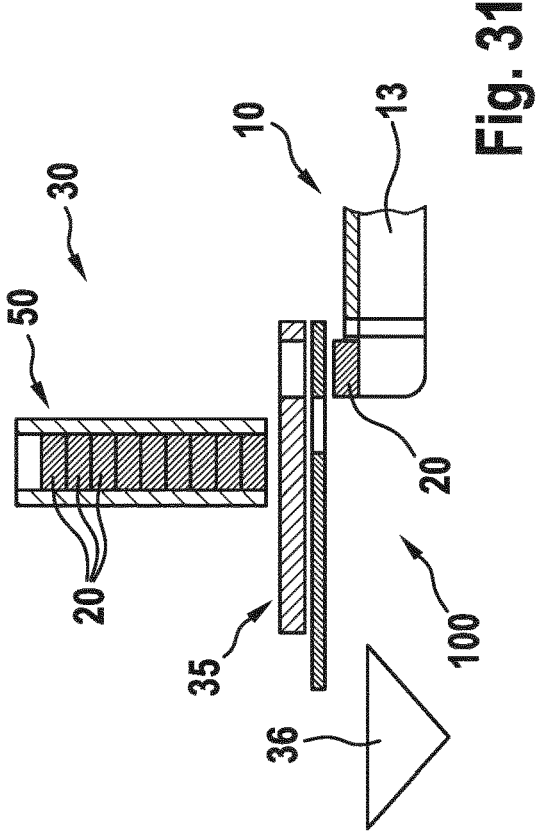

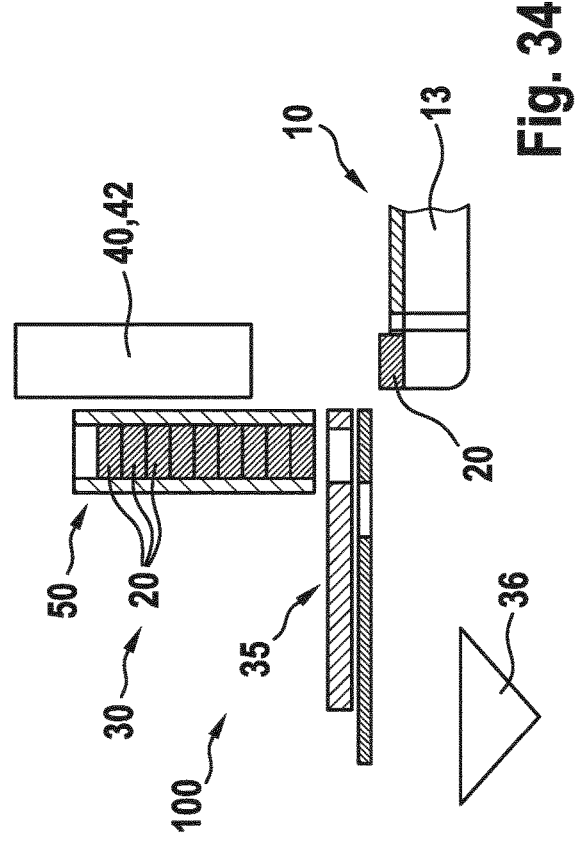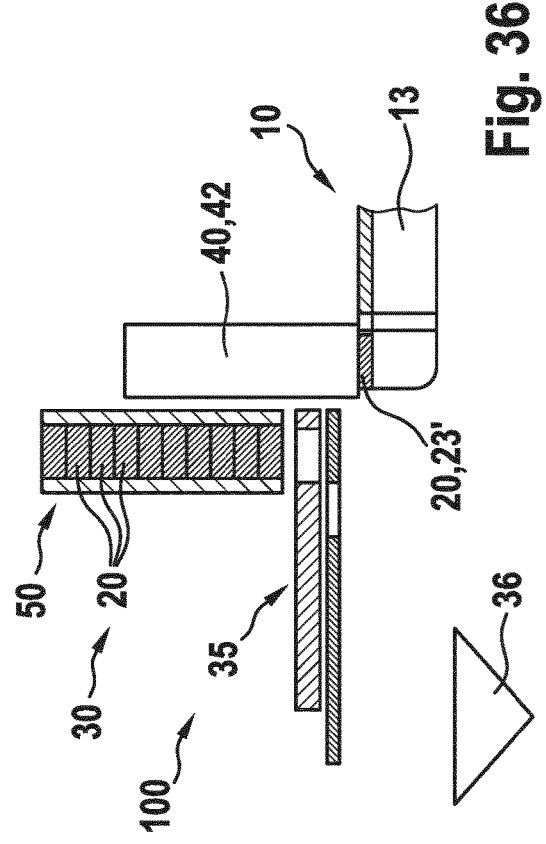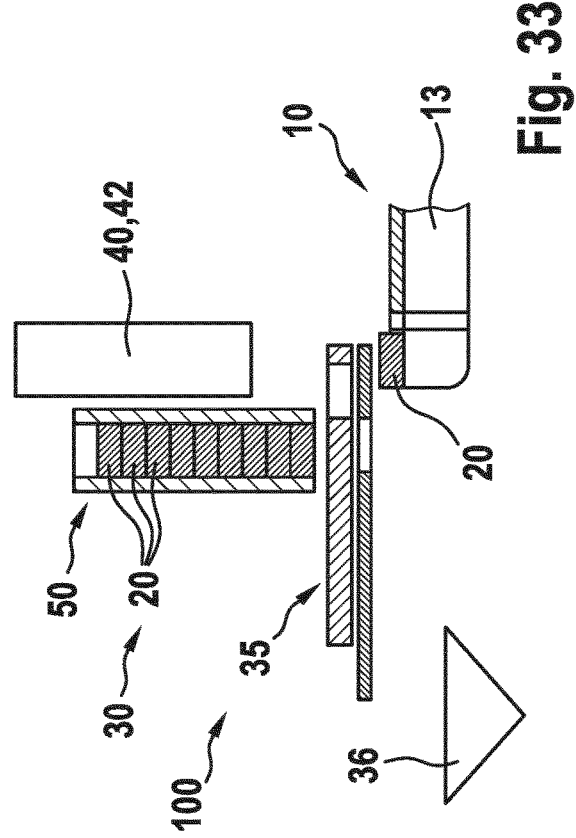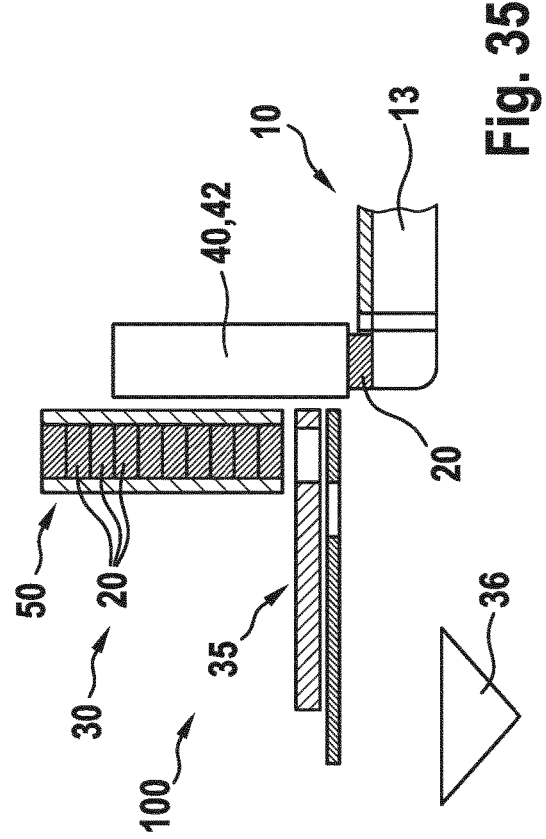

DEVICE AND METHOD FOR PRODUCING A COMPONENT

CROSS REFERENCE TO RELATED APPLICATIONS

This application is a continuation of PCT International Application No. PCT/EP2018/050512, filed Jan. 10, 2018, which claims priority under 35 U.S.C. § 119 from German Patent Application No. 10 2017 200 575.0, filed Jan. 16, 2017, the entire disclosures of which are herein expressly incorporated by reference.

BACKGROUND AND SUMMARY OF THE INVENTION

The present invention relates to a device and a method for producing a component, in particular in conjunction with weld points or weld point preparations to be formed on a sheet metal part by pressing resistance elements.

In the case of production and/or processing of components by pressing first and second component elements with one another, the component elements to be processed with one another must initially be provided and positioned and aligned in relation to one another. The actual procedure of pressing is carried out thereafter.

In the case of such methods, second component elements to be pressed into first component elements are conventionally, for example, presented and oriented manually, with corresponding disadvantages in terms of the desired throughput in the case of automatic processing. On the other hand, punching heads or other supply apparatuses within a pressing tool demand a comparatively large space requirement.

An object on which the invention is based is to provide a device and a method for producing a component in the case of which a high production throughput can be achieved with particularly simple and/or space-saving ways even in the case of corresponding modification of existing systems or methods.

This and other objects are achieved by way of a method for producing a component and by way of a device for producing a component according to embodiments of the invention.

According to a first aspect of the present invention, a method for producing a component is created, with the steps of providing a first component element with at least one recess, in particular in the manner of a through-hole, in or on at least a first surface of the first component element, positioning a second component element in the region of the recess and pressing the first component element and the second component element with one another and as a result forming a firmly bonded, positive-locking and/or non-positive connection between the first and second component element at least in the region of the recess. According to the invention, the positioning and the pressing are carried out separately from one another in terms of space and/or time functionally and in particular in terms of equipment.

A core aspect of the present invention is therefore the spatial and/or chronological separation of the various procedures required during production of the positioning of the components to be pressed with one another relative to one another and of the actual pressing. The automation and in particular the throughput of the production method can be increased overall as a result of these measures. The necessary space requirement in the press-in tool and/or at the joint for the supply and pressing in can additionally be reduced.

Moreover, no significant changes have to be made to existing methods and devices of the actual pressing in in order to achieve the advantages which can be achieved according to the invention.

Above and below, the recess of the first component element can be understood as a through-hole from a front side to a rear side of the first component element. The recess can be embodied to be beveled and/or with an imprinted edge, in particular for the formation of an undercut in the pressed-in state.

In the case of one concrete configuration of the method according to the invention for producing a component, a positioning tool is advantageously used for positioning and a pressing device and in particular a pressing tool and/or a C-bracket are used for pressing, wherein the positioning tool and the pressing tool or parts thereof are formed and/or are used spatially and/or functionally separately from one another. In the case of this embodiment of the method according to the invention, as a result of the spatial and/or functional separation, a mutual hindrance to the tools or tool parts required for the individual method steps is avoided.

It is particularly advantageous here if the positioning is carried out at a positioning point or positioning position of the first component element and the pressing is carried out at a pressing point or pressing position of the first component element and the positioning point and the pressing point of the first component element are spatially separated from one another and/or are called at or occupied by any tools used or parts thereof in a chronologically separate manner.

In principle, all devices which allow the separation of the procedures to be carried out in terms of space and/or time functionally and in particular in terms of equipment can be used as tools for positioning and/or pressing.

For example, a press with a tool lower part as a support for the first component element and with a tool upper part which can be removed from the tool lower part can thus be used as the pressing tool.

It is additionally conceivable here that a positioning point and a pressing point of the first component element are located in the region of the tool lower part.

For the purpose of positioning, a positioning apparatus or a part thereof can be moved to the positioning point if the tool upper part is in a state removed from the tool lower part and is removed from the positioning point and/or from the region of the tool lower part before the tool upper part leaves the state where it is removed from the tool lower part.

It is additionally or alternatively contemplated, as the positioning tool or as part thereof, to use an intermediate rack adapted to one or more positions of recesses of the first component element for one or more second component elements, which intermediate rack can be positioned in a correspondingly oriented manner in particular via a movement apparatus in relation to the recesses.

It is additionally or alternatively contemplated to use a robot arm apparatus which can be positioned in a controllable manner at one or more positions of recesses of the first component element, in particular in conjunction with an intermediate rack for one or more second component elements.

The procedure for supplying second component elements to the procedure of positioning and in particular to a positioning tool to be used in each case—which can also be referred to as feeding—has various advantageous configurations.

It is thus provided according to a further development of the method according to the invention that there is used to supply the positioning and in particular the positioning tool with second component elements a separating apparatus, in particular in the form of a bulk material separator, conveyor pot or vibrating pot, preferably in combination with a baffle, a multiple distributing guide and a receiver with an intermediate rack.

It is alternatively or additionally contemplated to use, for the purpose of supply, a magazine, in particular in the form of a drum or revolver magazine, a cartridge magazine, and/or a corresponding magazine store.

It is furthermore alternatively or additionally possible, for the purpose of supply, to use a procedure and/or a device for generating and/or processing—in particular by labeling, coating, profiling—of second component elements, in particular from a rod material.

The procedure of pressing has various advantageous possibilities for further development in terms of method and also in terms of apparatus.

It is thus advantageously possible in the case of another configuration of the method according to the invention to use a device with a C-bracket arrangement for pressing and in particular as a pressing tool and/or for supplying the positioning and in particular the positioning tool with second component elements.

A particularly compact form of the production method according to the invention with a compact design of the fundamental device is produced if, according to another alternative or additional further development in the case of the method, the supply of the positioning and in particular of the positioning tool with second component elements and in particular the positioning tool as such are driven by a drive for pressing and in particular of the pressing tool. The outlay in terms of equipment and process are reduced in this manner.

The fundamental first component elements can indeed be provided with already configured recesses, but it is alternatively possible, in the case of the method according to the invention for producing a component, to encompass a procedure of the formation of one or more recesses at least in or on the surface of the first component elements in the step of the provision of the first component element.

It is furthermore alternatively or additionally contemplated in the case of another further development of the method according to the invention to press one or more resistance elements, in particular in the form of slugs, as second component elements concretely on or in a sheet as a first component element for the subsequent formation of weld points.

According to another aspect of the present invention, a device for producing a component is also created which is configured in particular to carry out the method according to the invention, in particular in conjunction with a correspondingly configured control unit, and/or to be used in such a method according to the invention.

The device according to the invention for producing a component is formed with a unit for providing a first component element with a recess in or on a first surface of the first component element, with a unit for positioning a second component element in the region of the recess and with a unit for pressing the first component element and the second component element with one another and as a result the formation of a firmly bonded, positive-locking and/or non-positive connection between the first and second component element at least in the region of the recess.

The device according to the invention is furthermore configured so that the positioning and the pressing can be carried out separately from one another in terms of space and/or time functionally and in particular in terms of equipment.

Other objects, advantages and novel features of the present invention will become apparent from the following detailed description of one or more preferred embodiments when considered in conjunction with the accompanying drawings.

BRIEF DESCRIPTION OF THE DRAWINGS

FIG. 1 includes a schematic sectional view showing an intermediate state achieved in the case of one embodiment of the method according to the invention for the production of a component.

FIG. 2 includes a schematic sectional view showing an intermediate state achieved in the case of one embodiment of the method according to the invention for the production of a component.

FIG. 3 includes a schematic sectional view showing an intermediate state achieved in the case of one embodiment of the method according to the invention for the production of a component.

FIG. 4 includes a schematic sectional view showing an intermediate state achieved in the case of one embodiment of the method according to the invention for the production of a component.

FIG. 5 includes a schematic sectional view showing an intermediate state achieved in the case of one embodiment of the method according to the invention for the production of a component.

FIG. 6 includes a schematic sectional view showing an intermediate state achieved in the case of one embodiment of the method according to the invention for the production of a component.

FIG. 7 includes a schematic sectional view showing an intermediate state achieved in the case of one embodiment of the method according to the invention for the production of a component.

FIG. 8 includes a schematic sectional view showing an intermediate state achieved in the case of one embodiment of the method according to the invention for the production of a component.

FIG. 11 is a perspective side view showing one embodiment of a supply apparatus.

FIGS. 12A and 12B show, in a partially sectional side view or in a perspective exploded representation, a magazine for receiving and releasing second component elements in the form of a revolver or drum magazine.

FIG. 13 is a perspective side view showing one embodiment of a device according to the invention for producing a component.

FIGS. 14 and 15 are perspective side views showing combined positioning and pressing tools in the manner of a C-bracket arrangement.

FIGS. 16 to 20 show various views of embodiments of the device according to the invention using various magazines for receiving and for providing second component elements.

FIGS. 21 to 36 show, in a sectional side view, another embodiment of the device according to the invention in conjunction with various intermediate states which are reached in the realization of one embodiment of the method according to the invention.

DETAILED DESCRIPTION OF THE DRAWINGS

Figure 9:
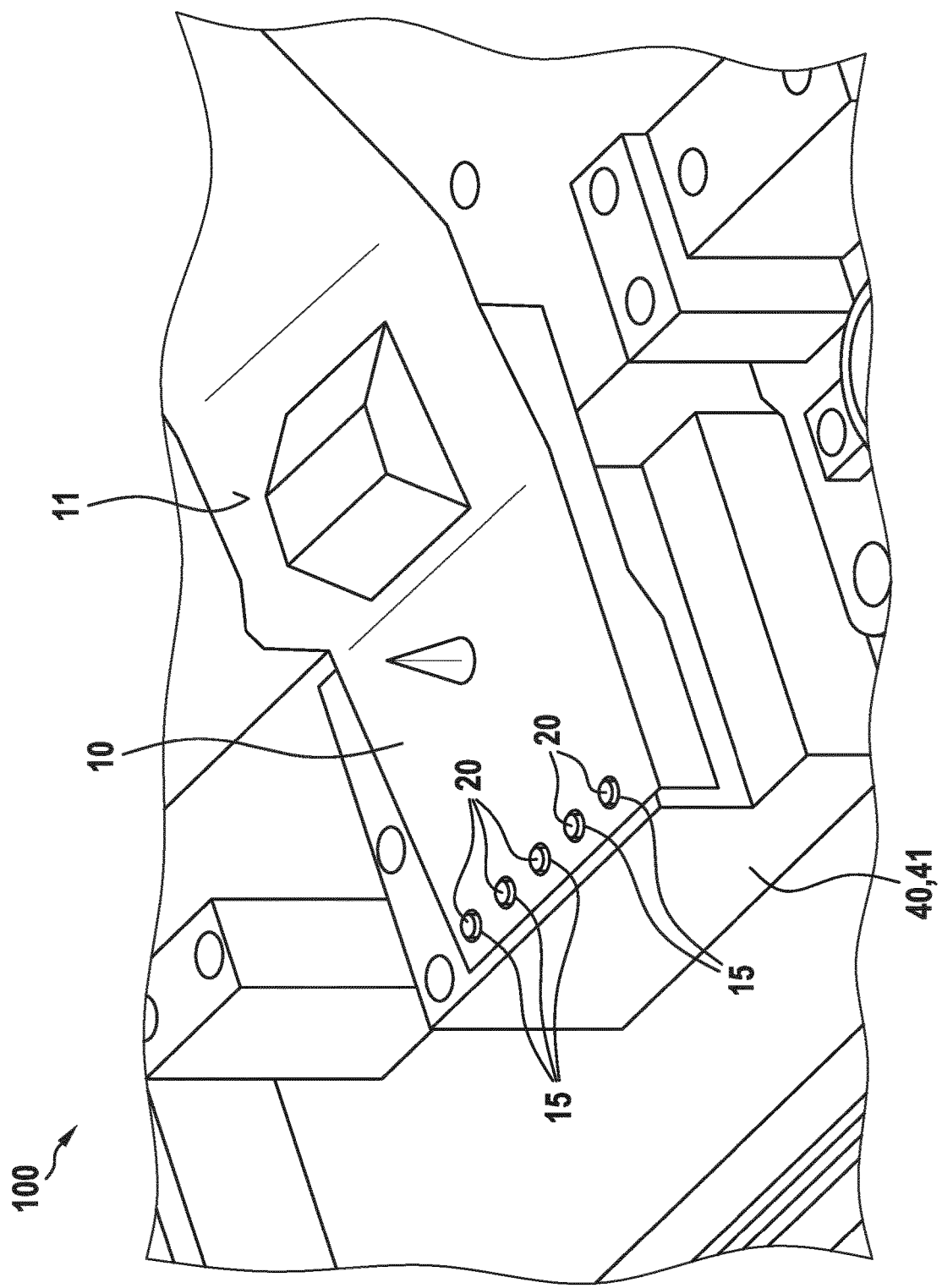
FIGS. 9 and 10 are perspective side views showing, in each case an intermediate state for one embodiment of the method according to the invention, in the case of which one or more first component elements are arranged in a tool lower part of a pressing tool fitted together with second component elements.

Exemplary embodiments and the technical background of the invention are described in detail below with reference to FIGS. 1 to 36. Identical or equivalent elements or components and elements and components with an identical or equivalent effect are designated by the same reference numbers. The detailed description of the designated elements and components is not reproduced in each case of occurrence.

The represented features and further properties can be isolated from one another in any desired form and combined with one another as desired without departing from the core of the invention.

FIGS. 1 to 8 show, in a schematic and sectional side view, various intermediate states which are reached in the case of one embodiment of the method according to the invention for producing a component 10, and indeed using an embodiment of device 100 according to the invention for producing a component 10.

FIG. 1 shows here the initial state in which a first component element 10 with a base body 13 is provided with a first surface or upper side 11 and a second surface or lower side 12.

In the transition to the intermediate state represented in FIG. 2, a recess 15 is formed in base body 13 of first component element 10. In the representation according to FIG. 2, recess 15 extends as a through-hole from upper side 11 to lower side 12. Such a structure is, however, not essential. On the contrary, recess 15 can also be formed as a true recess of upper side 11 or in under side 12, i.e. not fully penetrating through base body 13.

As has already been mentioned, recess 15 of first component element 10 can be embodied to be beveled and/or with an imprinted edge, in particular for the formation of an undercut in the pressed-in state via a recess producer.

In the transition to the intermediate state according to FIG. 3, a second component element 20 with a base body 23, an upper side 21, a lower side 22 and a shell surface is then positioned in the region of recess 15 of first component elements 10 by way of a conveyor and positioning tool (i.e. a mover or positioner) 30. Second component element 20 can be formed e.g. in the manner of a sheet slug which is coated all round.

In the transition to the intermediate state represented in FIG. 4, second component element 20 is then placed, positioned and/or fitted directly in the recess or in the region of recess 15.

In the intermediate state represented in FIG. 5, after fitting second component element 20 in recess 15 of first component elements 10, conveyor and positioning tool 30 have been removed from the region of recess 15 of first component elements 10 and does not stand in the way of pressing tool 40 which, in the transition to the intermediate state represented in FIG. 6, is moved into the region of recess 15 and second component element 20 positioned there.

FIG. 6 shows that second component element 20 is clamped in the region of recess 15 of first component element 10 quasi between a lower tool part 41, which can serve as a support, and an upper tool part 42 which can serve as an actual pressing part.

If tool lower part 41 is supposed to be used as a support for second component element 20, tool lower part 41 must already be present in the transition to the intermediate state shown in FIG. 4, i.e. during the supply of second component element 20, e.g. in the arrangement shown in FIG. 6, so that second component element 20 can be stored, where applicable, under the action of gravity, positioned on the upper side of tool lower part 41 in recess 15.

Marked by the arrows indicated in FIG. 6 in lower tool part upper tool part 41 or 42, in the transition to the intermediate state represented in FIG. 7, second component element 20 is then pressed in recess 15 of first component element 10 under the action of force by compression by way of tool lower part 41 and tool upper part 42 (i.e. press), as a result of which actual component 1 is generated.

An additional apparatus for retaining second component element 20 in recess 15 can alternatively be used. This function can also be taken on by tool upper part 42.

FIG. 8 then shows the final state of component 1 with deformed and pressed together form 23' of base body 23 of second component elements 20 in recess 15 of first component element 10.

Figure 10:
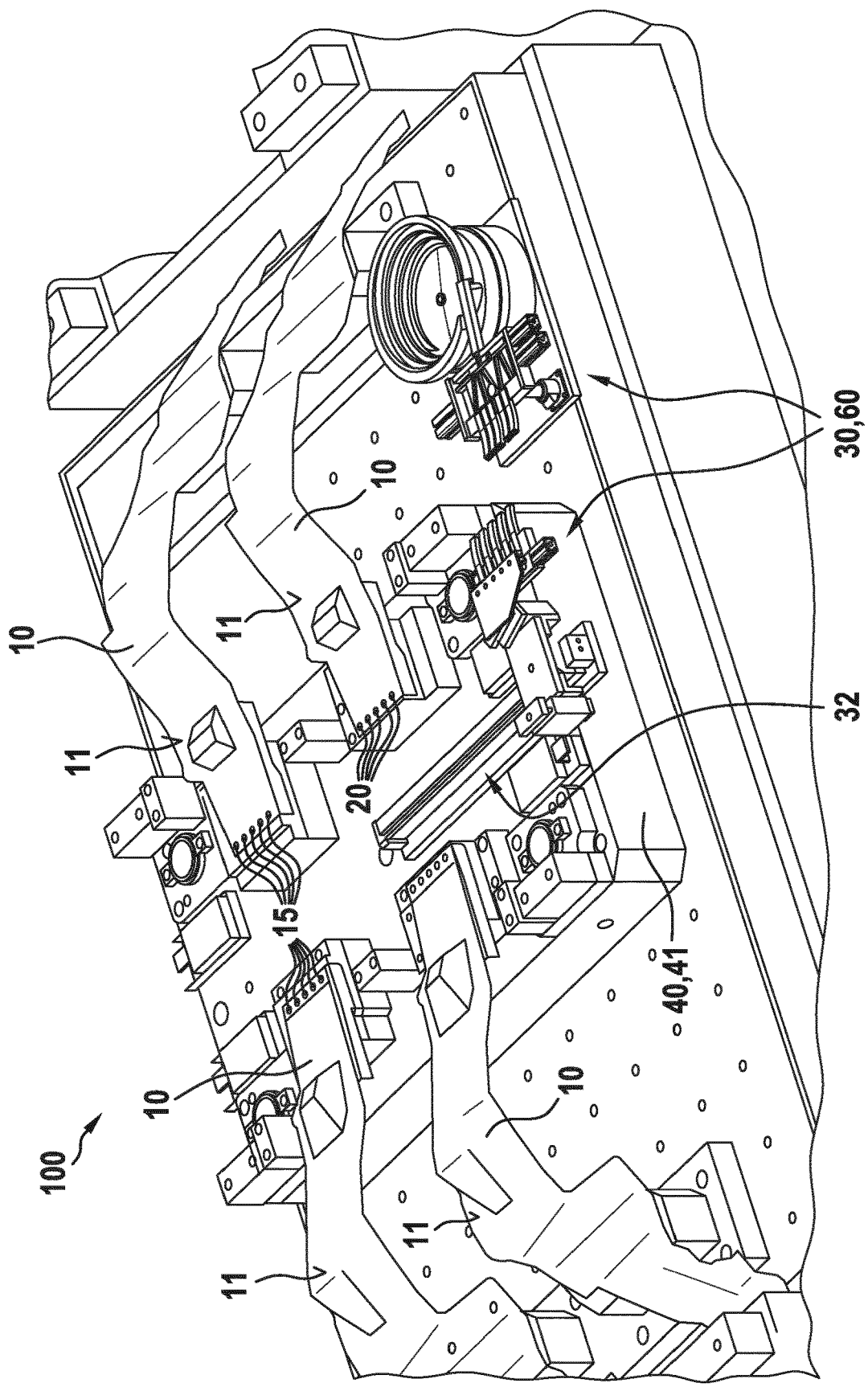

FIGS. 9 and 10 show, in perspective side views, in each case an intermediate state for one embodiment of the method according to the invention, in the case of which one or more first component elements 10 are arranged in a tool lower part 41 of a pressing tool 40 fitted together with second component elements 20 in recesses 15 of first component elements 10.

In these arrangements, respective tool upper parts 42 of fundamental pressing tool 40 are in a state removed from tool lower part 41 and thus release respective first component elements 10 and the regions of recesses 15 for equipping with second component elements 20.

FIG. 11 shows, in a perspective side view, an embodiment of a supply apparatus 30. In the case of the embodiment of FIG. 11, this includes what is known as a vibration spiral conveyor 60 with actual vibration spiral 61, a baffle 62 for the purpose of separation, a multiple distributing guide 63 for distribution into a hose system 64 with individual hoses 65 which open into a receiver 66 in order to place second component elements 20 supplied there in an intermediate rack 67 which can be adapted to relative positions and/or orientations of recesses 15 in a corresponding first component element 10.

As an alternative to a procedure of the bulk material supply with component separation, second component elements 20 can also be provided by means of a magazine 50.

FIGS. 12A and 12B show for this purpose, in a partially sectional side view or in a perspective exploded representation, a magazine 50 for receiving and releasing second component elements 20 in the form of a revolver or drum magazine 51.

FIG. 13 shows another embodiment of the device according to the invention for producing a component 1 using a robot arm apparatus 31 in combination with a vibration spiral conveyor 60, as was described in conjunction with FIG. 11. Tool lower part 41 of pressing tool 40 is represented again, wherein tool upper part 42 is in a state removed from tool lower part 41 so that robot arm apparatus 31 has free access to recesses 15 of first component elements 10 and their regions for equipping recesses 15 with second component elements 20 which are provided to intermediate rack 67 from receiver 66 downstream by vibration spiral conveyor 60.

In FIG. 13, any other conveyor can, as an alternative to vibration spiral conveyor 60, also be used to provide and/or separate second component elements 20.

FIGS. 14 and 15 show in a perspective side view combined positioning and pressing tools 30, 40, in each case in the manner of a C-bracket arrangement 70. These involve apparatuses which, in combination, realize the function of a conveyor and positioning tool 30 and of a pressing tool 40, in the case of which, however, the individual functionalities are separated from one another spatially and chronologically. The use of a C-bracket arrangement 70 enables a particularly compact design and a high processing speed.

FIGS. 16 to 20 show various views of embodiments of device 100 according to the invention using various magazines 50 for receiving and providing second component elements 20. In this case, various magazines 50 can also be combined to form superordinate magazine stores 59.

Figure 19B:
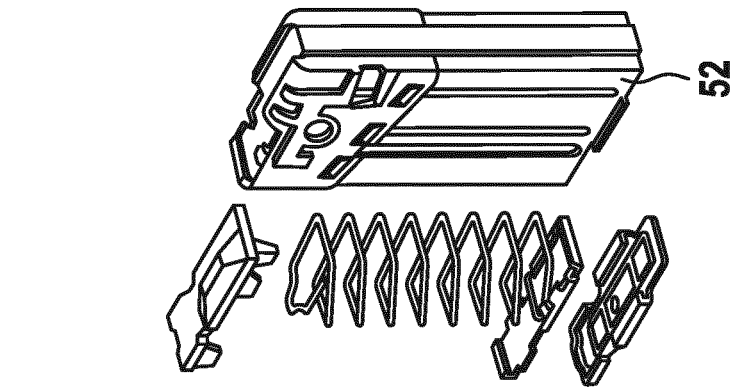
Figure 19A:
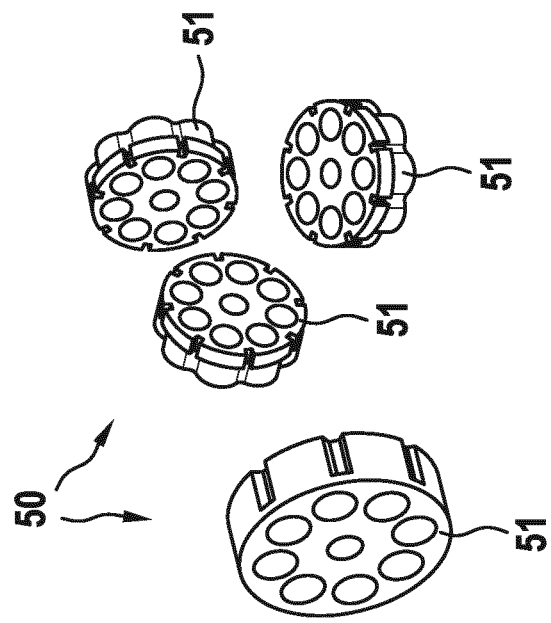
Figure 25:
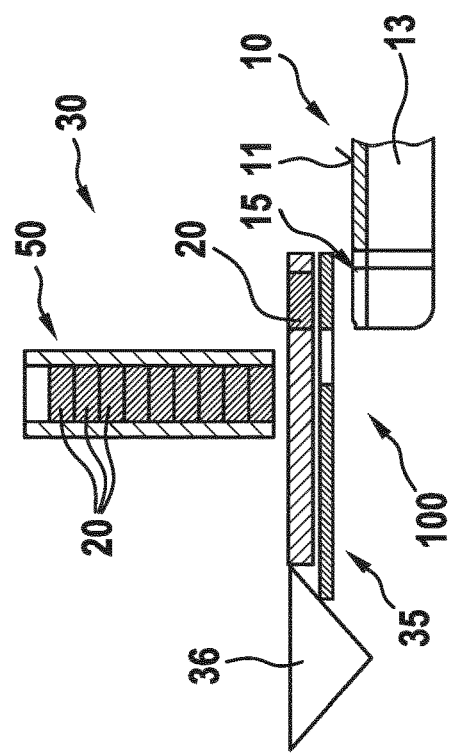
Figure 26:
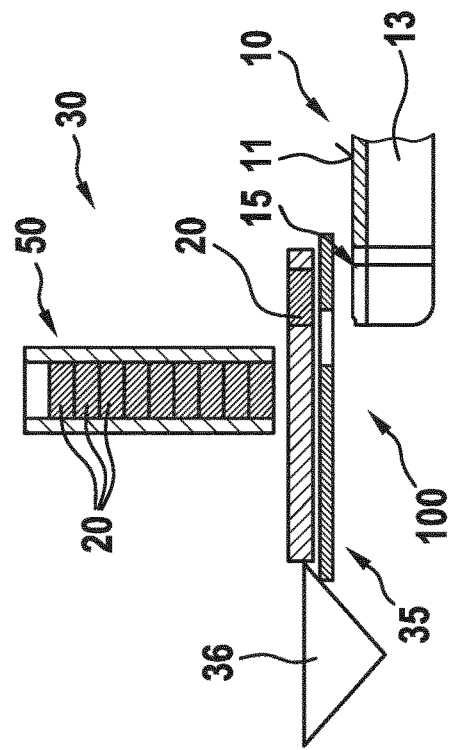
Figure 27:
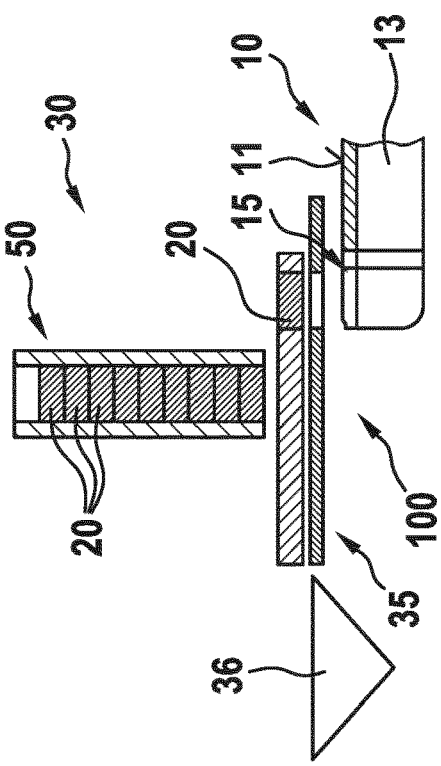
Figure 28:
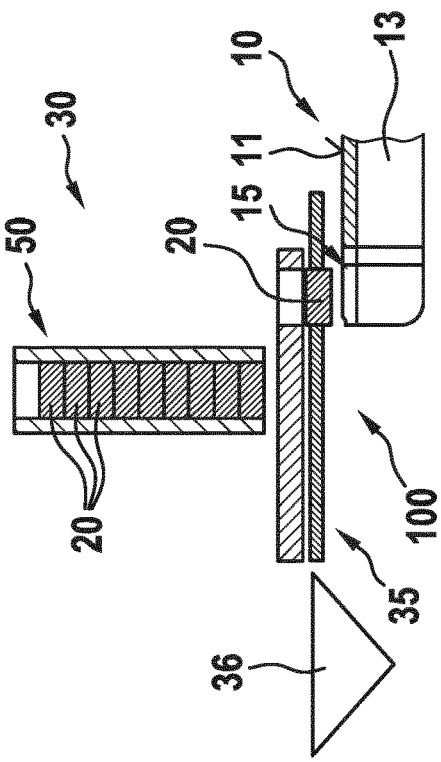

FIGS. 19A and 19B show various embodiments of magazines 50, namely in the form of drum or revolver magazines 51 or in the form of cartridge magazines 52.

FIGS. 21 to 36 show, in a sectional side view, another embodiment of device 10 according to the invention for the production of a component 1 in the context of various intermediate states which are achieved during the realization of an embodiment of the method according to the invention.

The starting point is the intermediate state represented in FIG. 21, in the case of which a first component element 10 is provided with a base body 13 and a recess 15 provided therein on upper side 11.

Second component elements 20 are furthermore provided via a conveyor and positioning tool 30 by way of a magazine 50. Conveyor and positioning tool 30 has what is known as a conveyor slide 35 which has a multi-part design for conveying second component elements 20 and a control slide 36 for control of conveyor slide 35.

The positions of the individual constituents of conveyor slide 35 and in particular of the receiving openings for receiving and release of second component elements 20 are mechanically controlled via the various positions of control slide 36 represented in FIGS. 1 to 36 so that in particular in the intermediate state represented in FIG. 29 a single second component element 20 is output in the region of recess 15 on upper side 11 of first component elements 10.

In the sequence of the intermediate states according to FIGS. 33 to 36, pressing of second component element 20 is then carried out in the region of recess 15 with first component element 10 with the application of force and pressure by tool upper part 42 of pressing tool 40, for example, in order to create a weld point in a sheet component, wherein the second component element acts in this context as a resistance element for the welding procedure.

These and further features and properties of the present invention are explained in greater detail on the basis of the following explanations:

The present invention also relates in particular to a supply device for resistance elements and a method for the supply of resistance elements as second component elements 20 to a first element component 10.

In the case of methods for the production of a component combination—therefore, for example, of a component 1 composed of a first component element 10 and a second component element 20—in particular by indirect joining, what are known as resistance elements or slugs can also be used as second component elements 20.

The supply of these slugs or resistance elements in pressing tool 40 is currently carried out manually. The use of punching heads and/or conveyor pots or vibrating pots to separate bulk material and accumulating conveying is not possible here in particular due to the increased construction volume.

A manual supply of second component elements 20 is not suitable for large-scale production and in particular prevents adequate automation.

Known apparatuses for the supply of second component elements 20 do not offer any technology in order to press these elements (resistance elements) 20 flush on both sides, taking into account the extraction forces required.

In particular punching heads demand a large space requirement in pressing tool 40 and potentially also in or outside press 40 (supply device) and can only be used to a limited extent and with a comparatively high outlay.

Moreover, as a result of the size of the punching heads, only a relatively large distance between the elements (resistance elements) 20 to be introduced can be represented.

One core aspect is the functional and/or equipment-related separation of supply and pressing in, and indeed in spatial and/or chronological terms.

Punching heads which were previously used in contrast unify the function or the supply and pressing in at a common location.

According to the invention, the resistance elements can be placed and/or deposited as second component elements 20 by way of separate supply 30 to corresponding points 15 on or in first component element 10 and/or in pressing tool 40, for example, in the case of opened pressing tool 40.

After deposition of second component elements 20, separate supply 30 again travels out of pressing tool 40, at least partially and in particular out of the actual embossing region of pressing tool 40, i.e., for example, out of the region of recess 15 in first component element 10. The functional space in pressing tool 40 is thus released again.

Pressing tool 40 subsequently closes and presses the resistance elements or slugs as second component elements 20 in first component element 10 in order to thus produce component 1 according to the invention.

Pressing can be carried out at the top and bottom, for example, also by way conventional tool constituents, for example, with embossing jaws.

A mobile supply 30, i.e. with a movable conveyor and positioning tool 30, is contemplated.

Multiple supplies with a device 30 and/or in a single cycle are also contemplated.

The space requirement at the target location for the supply of the resistance elements or slugs as second component elements 20, i.e. in particular in the region of respective recess 15 in first component element 10, is no longer required according to the invention.

Further processing of a second component element 20, for example, in the sense of labeling, coating or profiling, within a baffle 62 during supply by conveyor and positioning tool 30 is contemplated.

A generation of the resistance elements, e.g. from a rod material, is also possible directly by conveyor and positioning tool 30.

The following advantages arise according to the invention;

No additional space is required in pressing tool 40, at least at the positions for second component elements 20 or resistance elements since supply 30 is carried out spatially and/or chronologically separately from the pressing in.

A small distance can be realized between the individual second component elements 20 or resistance elements.

A multiple supply with a single separator is possible, for example, via a multiple distributing guide, in particular a quintuple distributing guide.

Accumulating conveying is also possible.

A direct generation and/or coating of second component elements 20 or resistance elements prior to or during supply is also contemplated.

It is possible to introduce additional parts or elements with second component elements 20 resistance elements in component 1 to be generated. For example, functional elements, sleeves for electromechanical separation and the like are contemplated.

A high degree of freedom is produced for the supply, e.g. as a result of insertion by way of robot tooling.

No hoses out of the tool into the surroundings of the press are required.

As is represented in the context of FIG. 9, for example, five slugs must be transported and deposited as second component elements 20 on the corresponding points in first component element 10 and thus, for example, in pressing tool 40.

According to FIG. 10, the separation and the provision of the slugs as second component elements 20 within pressing tool 40 are carried out using a corresponding vibration spiral conveyor 60. Supply 30 which frees up the space in the active region of pressing tool 40 again after deposition of slugs 20 is realized by a corresponding movement apparatus 32 for intermediate rack 67 of vibration spiral conveyor 60, e.g. by way of a linear axis.

According to the representation from FIG. 11, the division can be carried out by separation to a number of n positions, for example, within pressing tool 40 or first component elements 10 by way of multiple distributing guide 63.

The division of second component elements 20 by separation to a number of n positions can be carried out in or also in front of pressing tool 40 and/or first component elements 10 on the basis of a drum or revolver magazine 51 and/or with the functional principle of what is known as a "Gatling Gun".

Alternatively to this, a conveyor and/or positioning tool 30 can also be formed outside actual pressing tool 40, as is represented, for example, in the context of FIG. 13.

In this case, pressing tool 40 is formed without any element for a supply. The separation and provision of second component elements 20 or slugs are carried out outside pressing tool 40. The actual supply of second component elements 20 or slugs is then carried out, for example, with the aid of the same device which is used for component transport, i.e. in the same process step. This can be realized by industrial robots, oscillating arm robots, transfer rails, collaborating robots, pulley mechanization and the like.

In the case of an alternative embodiment with a variant inside the tool in relation to pressing tool 40, the procedure and/or the apparatus for the supply of second component elements 20 are driven mechanically by the drive of pressing tool 40 or by pressing tool 40 itself. Separation is not necessarily carried out, bulk material does not have to be present in this case, with it being possible to revert to a magazine solution.

Respective magazines 50 can have a spatially fixed position in relation to pressing tool 40.

Figure 18:
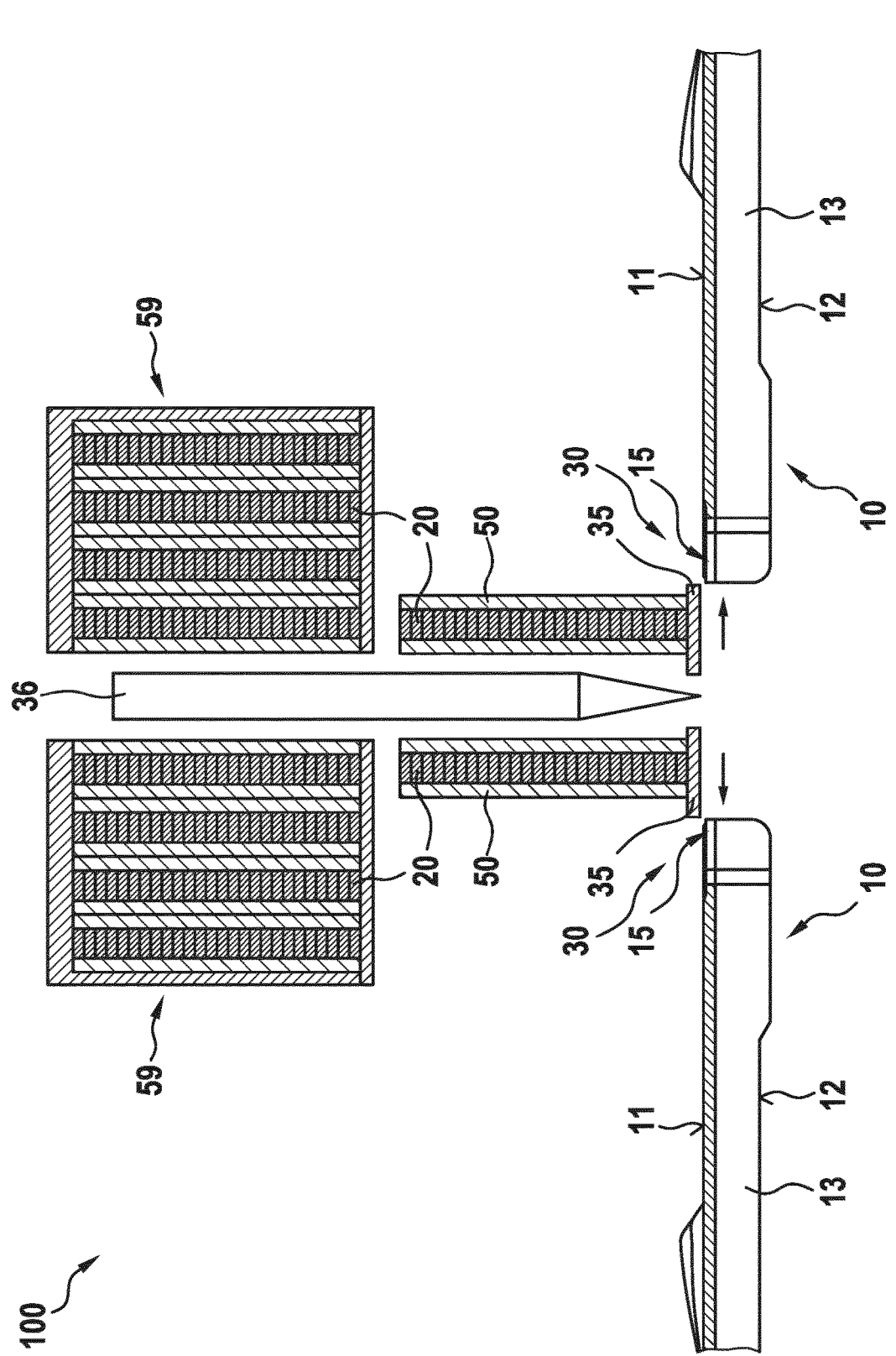

The drive of conveyor and positioning tool 30 can be carried out inside the tool, i.e. in the interior of pressing tool 40, for example, by drivers or slides 36 in tool upper part 42 of pressing tool 40, as is represented in conjunction with FIGS. 10 and 18.

Magazines 50 used release in each case only one individual second component element 20 or a single slug. The slug supply from magazine 50 into first component elements 10 is carried out, for example, by means of a mechanical device which can be driven inside the tool in particular in relation to pressing tool 40, for example, in an analogous manner to slide 36.

LIST OF REFERENCE NUMBERS

1 Component
10 First component element
11 First surface, upper side
12 Second surface, lower side
13 Base body
15 Recess
20 Second component element
21 First surface, upper side
22 Second surface, lower side
23 Base body
30 Conveyor and positioning tool
31 Robot arm apparatus
32 Direction of movement
35 Conveyor slide
36 Control slide
40 Pressing tool
41 Tool lower part, support
42 Tool upper part
50 Magazine
51 Revolver magazine, drum magazine
52 Cartridge magazine
59 Magazine store
60 Vibration spiral conveyor
61 Vibration spiral
62 Baffle
63 Multiple distributing guide
64 Hose system
65 Hose
66 Receiver
67 Intermediate rack
70 C-bracket arrangement
100 Device for component production The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for producing a component, the method comprising the acts of:
   providing a first component element with at least one recess in or on at least a first surface of the first component element;
   positioning a second component element in a region of the recess; and
   pressing the first component element and the second component element with each other and as a result forming a firmly bonded, positive-locking and/or non-positive connecting between the first and second component elements at least in the region of the recess,
   wherein
   the positioning and the pressing are carried out separately from each other in terms of space and/or time functionally;
   a plurality of recesses are formed on or in the first surface of the first component element;

a multiplicity of second component elements are positioned in respective recesses of the plurality of recesses and pressed with a pressing tool and/or a C-bracket apparatus; and the positioning and pressing of the multiplicity of second component elements in the respective recesses of the plurality of recesses and the forming of one or more remaining recesses of the plurality of recesses are carried out simultaneously.

2. The method according to claim 1, wherein
the recess is in a form of a through-hole.

3. The method according to claim 1, wherein
the positioning and the pressing are carried out separately from each other in terms of equipment.

4. The method according to claim 1, wherein
a positioning tool is used for positioning,
a pressing tool and/or a C-bracket apparatus are used for pressing, and
the positioning tool and the pressing tool or parts thereof are formed and/or are used spatially and/or functionally separately from one another.

5. The method according to claim 4, wherein
a press with a tool lower part as a support for the first component element and with a tool upper part which can be removed from the tool lower part is used as the pressing tool,
a positioning point and a pressing point of the first component element are located in the region of the tool lower part, and
at least a part of the positioning tool is moved to the positioning point after the tool upper part is removed from both the tool lower part and the positioning point, and/or
the part of the positioning tool is removed from the region of the tool lower part before the tool upper part moves to the tool lower part.

6. The method according to claim 4, wherein the positioning tool is driven by the pressing tool.

7. The method according to claim 1, wherein
the positioning is carried out at a positioning point of the first component element and the pressing is carried out at a pressing point of the first component element, and
the positioning point and the pressing point of the first component element are spatially separated from one another and/or are called at or occupied by any tools used or parts thereof in a chronologically separate manner.

8. The method according to claim 7, wherein
a press with a tool lower part as a support for the first component element and with a tool upper part which can be removed from the tool lower part is used as the pressing tool,
the positioning point and the pressing point of the first component element are located in the region of the tool lower part, and
at least a part of the positioning tool is moved to the positioning point after the tool upper part is removed from both the tool lower part and the positioning point, and/or
the part of the positioning tool is removed from the region of the tool lower part before the tool upper part moves to the tool lower part.

9. The method according to claim 1, wherein
the at least one recess of the first component element includes a plurality of recesses, and as a positioning tool or a part thereof,
an intermediate rack adapted to one or more positions of the plurality of recesses of the first component element is used for one or more second component elements, which intermediate rack is positionable in a correspondingly oriented manner, and
a robot arm apparatus which is positionable in a controllable manner at one or more positions of the plurality of recesses of the first component element is used.

10. The method according to claim 9, wherein
the intermediate rack is positionable in the correspondingly oriented manner via a movement apparatus in relation to the plurality of recesses of the first component element, and
the robot arm apparatus is used in conjunction with the intermediate rack for one or more second component elements.

11. The method according to claim 10, wherein
the positioning of the second component element is carried out by employing:
a separating apparatus;
a magazine; and/or
a procedure and/or a device for generating and/or processing of second component elements.

12. The method according to claim 11, wherein
the positioning of a positioning tool of the second component element is carried out by employing:
the separating apparatus in the form of a bulk material separator, conveyor pot or vibrating pot, in combination with a baffle, a multiple distributing guide and a receiver with an intermediate rack;
the magazine in the form of a drum or revolver magazine, a cartridge magazine, and/or a corresponding magazine store; and/or
the procedure and/or the device for generating and/or processing of the second component elements by labeling, coating, or profiling from a rod material.

13. The method according to claim 1, wherein
a device with a C-bracket arrangement is used for the positioning of the second component element and the pressing of the first component element and/or the second component element.

14. The method according to claim 1, wherein
the positioning of the second component element is carried out by way of a drive for pressing.

15. The method according to claim 1, wherein
the act of providing the first component element comprises forming the recess at least in or on the first surface.

16. The method according to claim 1, wherein
the second component element comprises one or more resistance elements;
the first component element is a sheet; and
the second component element is pressed on or in to the first component element for a subsequent formation of weld points.

17. The method according to claim 16, wherein the one or more resistance elements are in the form of slugs.

* * * * *